May 23, 1939.  F. F. RIKE ET AL  2,159,178

TANK CAP AND VENT VALVE

Filed Aug. 10, 1936  2 Sheets-Sheet 1

INVENTORS
FREDERICK F. RIKE
HOWARD W. WEBB
BY
ATTORNEYS

May 23, 1939. F. F. RIKE ET AL 2,159,178
TANK CAP AND VENT VALVE
Filed Aug. 10, 1936 2 Sheets-Sheet 2

INVENTORS
FREDERICK F. RIKE
HOWARD W. WEBB
BY
ATTORNEYS

UNITED STATES PATENT OFFICE 2,159,178

TANK CAP AND VENT VALVE

Frederick F. Rike and Howard W. Webb, Dayton, Ohio, assignors to Buckeye Iron & Brass Works, Dayton, Ohio, a corporation of Ohio Application August 10, 1936, Serial No. 95,101

3 Claims. (Cl. 220—57)

This invention relates to improvements in closures or caps for tanks for use with various fluids, for instance gasoline or oil tank trucks, and vent valves therefor.

It is a particular object of this invention to provide a closure for the inlet opening of a gasoline tank truck which will automatically close when the tank is moved. This insures the closing of the cap as soon as the tank is moved, in case the operator fails to close the same before proceeding on his journey.

It is a further object of this invention to provide the tank with a vent and valve, so that in case the pressure in the tank exceeds the desired amount, the pressure will open the valve and permit the excess pressure to escape.

A further object of the invention is to provide the tank with a valve which will open when gasoline is drawn from the tank so as to admit air to the tank above the gasoline, so that the gasoline will flow out of the outlet provided for the tank.

A further object of the invention is to provide the vent for the tank with a valve which will close automatically, in case the truck turns over, so as to prevent the escape of gasoline from the tank.

These and other advantages will appear from the following description taken in connection with the accompanying drawings.

Referring to the drawings.

Figure 1:
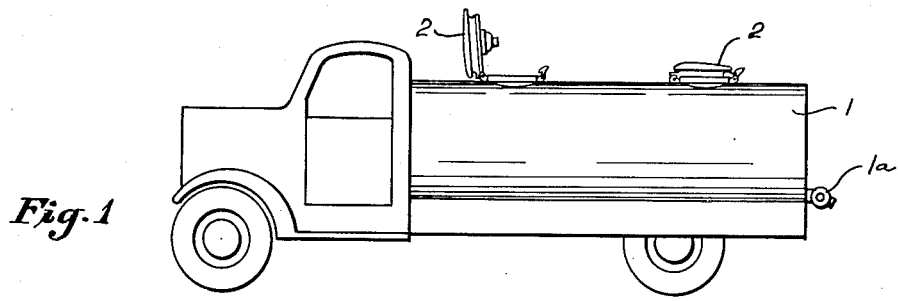
Fig. 1 is a side elevation of a truck carrying a tank provided with two of our improved closures, one being open and the other closed.
Figure 2:
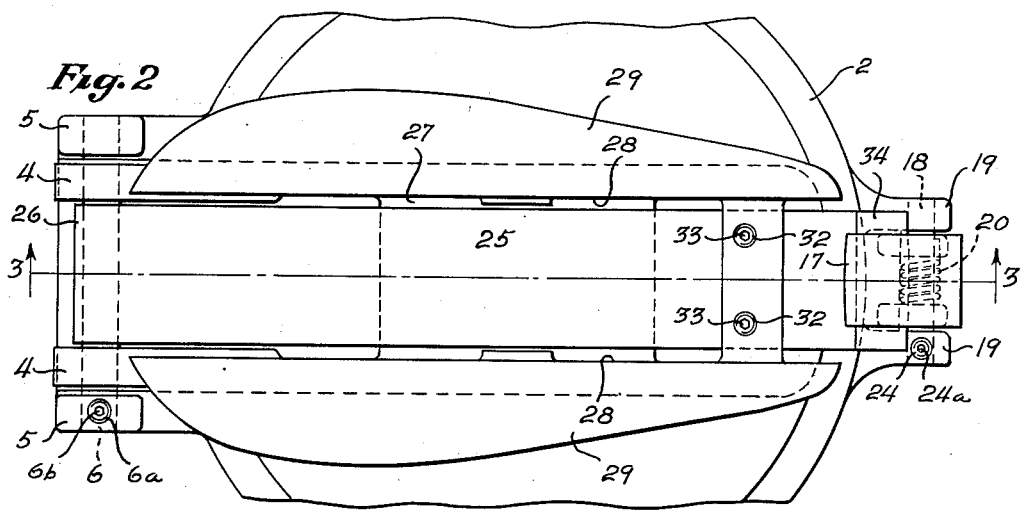
Fig. 2 is a top plan view of the closure or cap in closed position, with portions of the cap broken away.

The present invention is adapted to be used with any tank and particularly such tanks which are utilized to receive fluids at one point and convey the same to another and discharge the fluids therefrom.

The valves employed with our invention are also adapted for use with stationary tanks, to permit the escape of excess pressure and to admit air so that the contents can be drawn from the tank. In the drawings our invention is shown as applied to a gasoline tank truck in which the tank, shown at 1, having a discharge valve 1a, is provided with two caps or closures 2, 2 for closing filler openings through which the contents are supplied to the tank. One of these inlets is shown at 3 in Fig. 3. The cap 2 is provided with lugs 4, 4 through which it is hinged to lugs 5, 5 by the pin 6, retained against displacement by a set screw 6a. The lugs 5, 5 are formed on a ring 7 adjustably mounted on a neck 8 of the tank 1.

The ring 7 is secured to the neck 8 by a fitting 9 which is threaded into the upper end of the neck 8 of the tank 1. The fitting 9 has lugs 10 to which a suitable tool can be applied for screwing the fitting into position in the neck 8 or removing it therefrom. Near its upper end the fitting 9 has an outwardly extending annular flange 11 which projects over the ring 7. At the upper end of the fitting 9 there is provided a seat 12, over which projects the cap 2. A gasket 13 is placed between the cap 2 and the seat 12 of the fitting 9 to prevent the escape of the gasoline or other liquid between the cap 2 and the fitting 9. An annular flange 14, projecting under the inner edge of the gasket 13, is provided to retain the gasket in position on the cap 2.

Gaskets 15 and 16 are provided to prevent the escape of gasoline between the ring 7, the neck 8 and the fitting 9.

The cap or closure 2 is locked in closed position by the catch 17, which is pivoted at 18 between lugs 19, 19 on the ring 7. The catch 17 is held in locking position by a spring 20 coiled about the pivot 18. This spring 20 has one leg 21 bearing against a lug 22 on the ring 7, and another leg 23 bearing against the catch 17. A set screw 24 holds the pivot pin 18 against displacement. The set screw 24, and the set screw 6a are provided with irregularly shaped sockets 6b and 24a, respectively, to receive a tool for inserting and removing the same.

The cap 2 is provided with a retaining member 25, which is engaged by the catch 17 to lock the cap 2 in closed position. This retaining member, in the form illustrated, is a leaf spring, which has its end 26 coiled about the pin 6. The retaining member rests on a cross piece 27 carried by upstanding flanges 28, 28 on the cap 2. The flanges 28, 28 are provided at their upper ends with laterally extending flanges 29, 29.

A cross piece 30 extends between the flanges 29 and over the spring retaining member 25. The latter has threaded therein screws 31 (only one being shown) for adjusting the pressure of the spring retaining member 25. After these adjusting screws are set to provide the desired pressure in the spring retaining member 25, they are locked in position by the set screws 32, 32, provided with irregularly shaped sockets 33, 33 for receiving a tool to set these screws.

The ring 7 is so positioned on the neck 8 of the tank that the pin 6 of the cap 2 is at the forward edge of the inlet opening to the tank. In this way the cap is pivoted at the forward edge of the inlet to the tank. When this cap 2 is lifted to permit gasoline or other liquid to be placed in the tank, the cap is swung to such a position that it will remain open without being held. It can be raised so that it will stand vertically or it can be swung forwardly of the vertical. As soon as the cap reaches dead center or is moved forwardly of the dead center, it will remain open without being held.

After the liquid is placed in the tank, the operator closes the cap and it is locked in position by the catch 17 and spring retaining member 25. However, if the operator fails to close the cap, the same will be automatically closed and locked in position as soon as the truck is moved forwardly, due to the inertia of the cap, which is made quite heavy. As soon as the cap reaches a position to the rear of dead center, it will close due to its own weight. The end 34 of the retaining member 25, which is curved as shown, engages under catch 17, which has a hook nose 35 for this purpose. This locks the cap 2 in position and prevents opening thereof until the operator moves the catch 17 rearwardly on its pivot 18, against the pressure of the spring 20, to release the retaining member 25, so that the cap can be lifted.

The catch 17 has a cam surface 17$^a$ and a cam surface 17$^b$ which cooperate with the curved end 34 of the retaining member 25. This curved end forms an upper and a lower cam surface, 34$^a$ and 34$^b$, respectively. As the cap 2 drops toward the filler opening of the tank, the lower cam surface 34$^b$ of the retaining member engages the upper cam surface 17$^a$ of the catch 17, as the cam surface 17$^a$ is held in the path of the curved end 34 by the spring 20. Further downward movement of the cap, through the engagement of the lower cam surface 34$^b$ with the cam surface 17$^a$, forces the catch out of the path of the curved end 34 of the retaining member 25. The curved end continues to move downwardly until the cam surface 17$^b$ on the catch engages the upper cam surface 34$^a$ on the curved end 34 of the retaining member. The spring 20 thereupon moves the catch into locking position over the curved end 34. Due to the action of the cam surfaces 34$^a$ and 17$^b$, the right hand end of the spring retaining member 25 is forced downwardly and away from the adjusting screws 31. This action places the spring retaining member under further tension and securely locks the retaining member and cap in closed position. Thereafter the cap cannot be opened until the catch 17 is moved to the right. The spring retaining means and the spring 20 cooperate to hold the catch in locked position when the cap is closed.

When the cap is open, the spring retaining member 25 bears against the adjusting screws 31, while this retaining member is moved away from these screws as the catch 17 moves over the curved end of this member.

Pressure frequently accumulates in tanks of this kind, and to prevent the same we provide a relief valve 36 above an opening 37 which is connected to passageways 38, 38, extending into a chamber 39 in the cap 2. The opening 37 and passageways 38, 38 are in a fitting 39$^a$ which is threaded into an annular flange 40 depending from the cap 2. A gasket 41 is provided between the upper part of the fitting 39 and an inwardly extending shoulder 42 on the flange 40, to make the joint between the fitting 39$^a$ and the flange 40 liquid tight. The valve 36 has a stem 36$^a$ and it is guided in its movements by a guide 36$^b$ carried by the fitting 39$^a$.

An aperture 43, opening into the atmosphere, is provided in the cap 2. It communicates with the chamber 39 so as to permit the escape of pressure from the tank 1 when the relief valve 36 opens. As shown by the arrows pointing upwardly in Fig. 3, the pressure escapes through the opening 37, around the valve 36 when open, through the passageways 38, the chamber 39 and the aperture 43. A screen 44 is mounted in the chamber 39 to prevent the entrance of dirt into the passages 38.

This relief valve 36 prevents the accumulation of pressure in the tank and thereby protects the tank against internal pressure.

When liquid is withdrawn from the tank 1, for which purpose the valve 1$^a$ is provided, it is necessary at times to admit air to the tank so that the liquid will discharge therefrom. For this reason a valve 45 is provided to close the opening 46 in the fitting 39$^a$. The opening 46 communicates with a chamber 47 formed by the fitting 39$^a$ and a plug 48 screwed into the fitting 39$^a$. The chamber 47 communicates with passageways 49 which are in communication with the tank 1. The plug 48 is provided with an upstanding guide 50 for a stem 51 carried by the valve 45. In this way the valve 45 is guided in its movements in opening and closing the opening 46.

Figure 3:
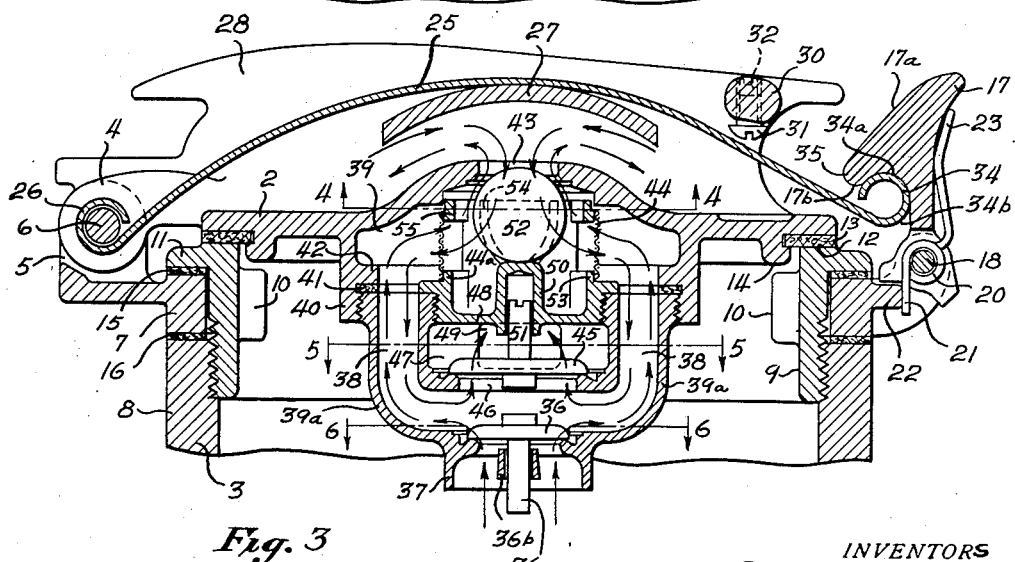
Fig. 3 is a vertical section on the line 3—3 of Fig. 2, looking in the direction of the arrows and showing the valves for permitting the escape of excess pressure from the tank, the valve for admitting air to the tank, and the valve for closing the vent in case the tank is turned over.
Figure 4:
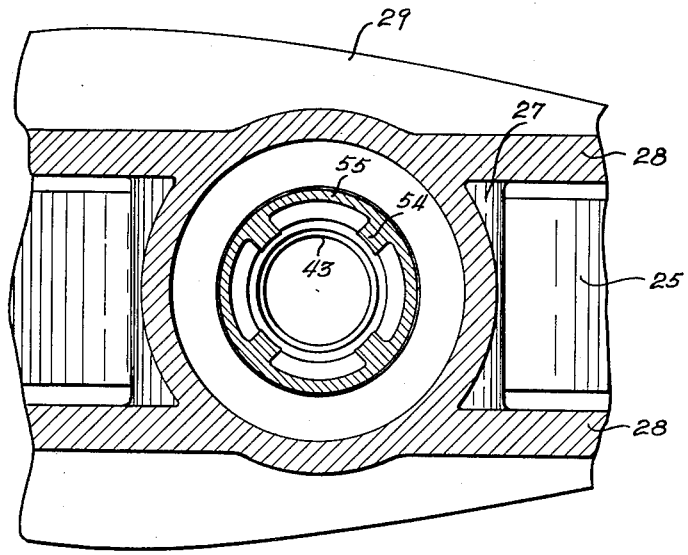
Fig. 4 is a horizontal section on the line 4—4 of Fig. 3, looking in the direction of the arrows and showing a portion of the cap and the valve for closing the vent in case the tank is turned over.
Figures 5, 6:
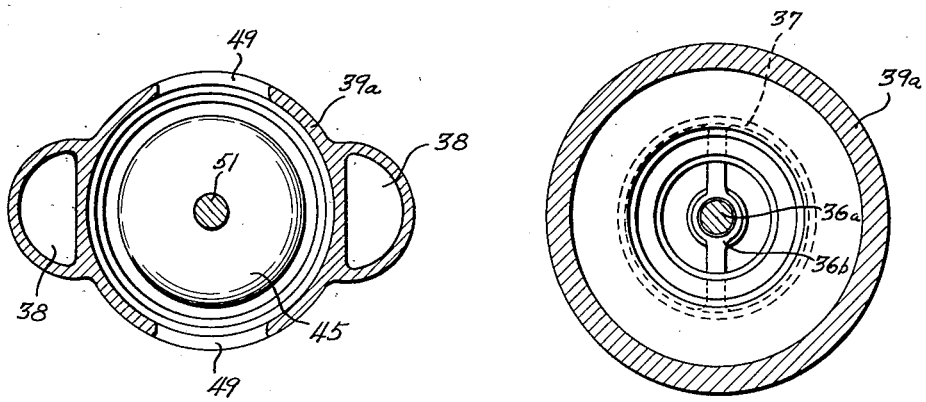
Fig. 5 is a horizontal section on the line 5—5 of Fig. 3, looking in the direction of the arrows and showing the valve and passageways for admitting air to the tank when gasoline is being withdrawn therefrom.
Fig. 6 is a horizontal section on the line 6—6 of Fig. 3, looking in the direction of the arrows and showing the seat for the pressure relief valve and the guide for the valve stem.

The arrows pointing downwardly in Fig. 3 show the path of the air which is admitted to the tank at such times as that is necessary for withdrawing liquid from the tank 1. This air enters through the opening 43, which is in communication with the atmosphere, and thence passes through screen 44 and into the chamber 39. It then enters the passageways 38 and the opening 46. Whenever the pressure in the tank is less than atmospheric pressure, the air in the opening 46 will lift the valve 45 so as to permit the air to pass this valve. It will then enter the chamber 47 and enter the tank 1 through the passageways 49. This will continue until the atmospheric pressure is unable to lift the valve 45 against the pressure in the tank 1, whereupon the valve 45 will close the opening 46 and remain closed until the atmospheric pressure can again raise the valve 45 against the pressure in the tank 1.

In case the tank should be turned over, we have made provision for preventing the escape of the liquid in the tank. For this purpose we have provided a ball valve which is normally open to the atmosphere to admit air to the tank 1 when the valve 45 is open and to permit the escape of pressure from the tank 1 when the valve 36 is open. Should the tank turn over, however, the ball valve 52 will close the aperture 43, due to its weight, and thus prevent the escape of liquid from the tank. The downward movement of the ball valve 52 is limited by the top of the guide 50, upon which this ball valve rests when the tank is upright.

The plug 48 is also provided with an upstanding flange 53 carrying upstanding ribs 54 between which the air passes on going through the screen 44. A ring 55 is provided at the upper end of the ribs 54 to connect them together. The ball valve 52 lies between these ribs 54. The screen 44 surrounds the upstanding flange 44a of the plug 48, the ring 55 and the ribs 54.

By our invention we have provided a tank for liquids having:

1. A cap or closure which closes automatically as the tank is moved.

2. Means for permitting the escape of pressure accumulating in the tank.

3. Means for admitting air to the tank when needed to permit the flow of liquid from the tank.

4. Means for closing the air opening for the tank when the tank is turned over.

It is, of course, to be understood that the use of the term "gasoline" is merely illustrative and that we contemplate the use of the principles of our invention in structures used with other various fluids.

It will likewise be understood that the above described structure is merely illustrative of one manner in which the principles of our invention may be carried out and that we desire to comprehend within our invention such modifications as come within the scope of the claims and the invention.

Having thus fully described our invention what we claim as new and desire to secure by Letters Patent is:

1. In a tank for liquids having a filler opening therein, a cap hinged to said tank and adapted to open and close said opening and adapted to be closed by movement of said tank, spring retaining means cooperating with said cap, means mounted on said cap for adjusting the compression of said spring retaining means and for limiting the upward movement of the free end of said spring retaining means, and spring pressed locking means pivoted to said tank and adapted to engage said spring retaining means to lock the cap in closed position upon its being closed.

2. In a tank for liquids having a filler opening therein, a neck around said opening, a ring at the upper end of said neck, means for securing said ring to said neck, a cap movably secured to said ring and adapted to be closed by movement of said tank, locking means movably secured to one side of said ring, a spring retaining means secured at one end to the opposite side of said ring and cooperating with said lock means to secure said cap in closed position, a member on said cap and engaging said spring retaining means intermediate its ends to limit the downward movement of said spring retaining means, and means for adjusting the compression of said spring retaining means.

3. In a tank for liquids having a filler opening therein, a neck around said opening, a ring at the upper end of said neck, a gasket between said neck and ring to prevent leakage between them, removable means engaging said neck for securing said ring to said neck, a gasket between said ring and securing means to prevent leakage between them, lugs on said securing means for engagement by a tool for attaching the same to the neck and removing the same therefrom, a cap hingedly secured to said ring for closing the opening in said tank by engagement with said means for securing the ring to the neck, a gasket between said cap and said securing means to prevent leakage between them, and means for locking said cap in closed position.

FREDERICK F. RIKE.
HOWARD W. WEBB.